Patented Aug. 30, 1932

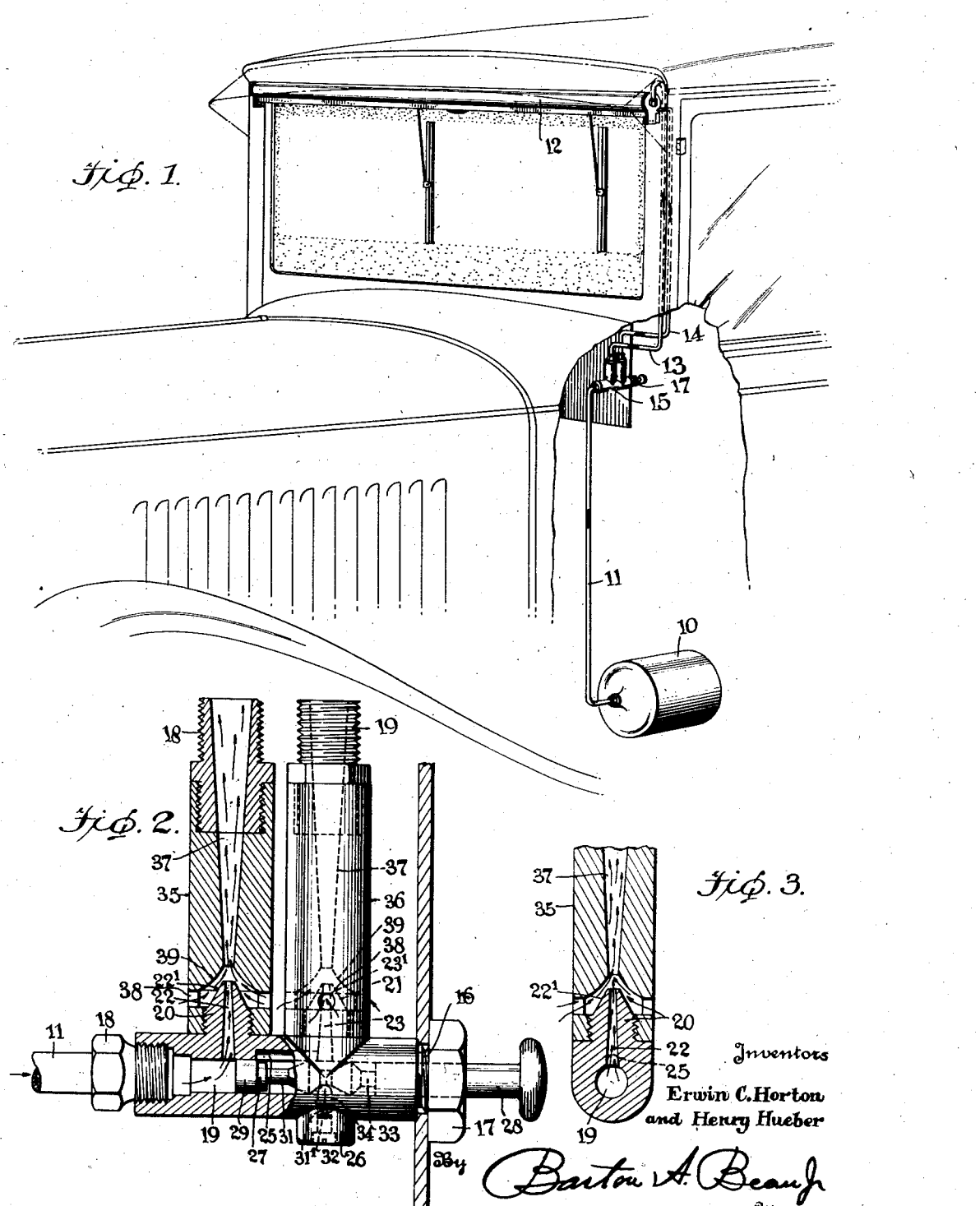

1,874,294

UNITED STATES PATENT OFFICE

ERWIN C. HORTON, OF HAMBURG, AND HENRY HUEBER, OF BUFFALO, NEW YORK, ASSIGNORS TO TRICO PRODUCTS CORPORATION, OF BUFFALO, NEW YORK

COMPRESSED AIR OPERATED WINDSHIELD CLEANER SYSTEM

Application filed March 20, 1930. Serial No. 437,577.

This invention relates to windshield cleaners of the fluid pressure operated or automatic type.

Ordinarily, windshield cleaners are operated by suction or negative pressure as derived from the intake manifold of the motor vehicle engine. This source produces a variable pressure and results in an unstable operation of the cleaner. Certain types of vehicles, such as the motor bus, are provided with brake systems utilizing a positive pressure but the pressures are too great for the safe operation of the light motor of a windshield cleaner.

An object of the present invention is to provide means for the safe utilization of the air pressure supply of air brake systems on motor vehicles as a motive power for a windshield cleaner.

The present invention aims to reduce the high pressure of the air brake or other system for application to a windshield cleaner, and to do so economically and without danger to the relatively frail structure of a windshield cleaner.

A further object of this invention is to provide a positive pressure windshield cleaner system which will guard against injury thereto upon the accidental blocking of the windshield cleaner in operation by avoiding the building up of excessive pressures throughout the apparatus.

In the accompanying drawing:—

Fig. 1 is a perspective view of an automobile provided with a positive pressure windshield cleaner system, a portion of the vehicle being broken away to show the valve and piping arrangement.

Fig. 2 is a longitudinal section through the control valve and injector, parts being left in elevation.

Fig. 3 is a fragmentary cross section taken transversely of Fig. 2.

Referring more in detail to the drawing, the numeral 10 designates an air pressure tank which may be assumed to receive its supply from any suitable source, such supply being primarily utilized for the application of the brakes on the vehicle. A supply pipe 11 is connected to the said tank and leads to the pressure reducing apparatus hereinafter described.

A windshield cleaner 12 is mounted upon the windshield of the automobile, as shown in Fig. 1, and is shown as the horizontal stroke type set forth in the patent to Hueber No. 1,716,135, granted June 4, 1929, the valve arrangement being adapted for the utilization of greater than atmospheric or positive rather than the sub-normal or negative pressures usually used on such cleaner. Such cleaner is provided with the usual operating conduit 13, and a parking conduit 14, both of which are herein extended downwardly and connected to the pressure reducing apparatus about to be described.

The pressure reducing apparatus includes a valve body 15, adapted to be mounted in an accessible place, such as the dash board of the automobile. In the preferred showing the said body is provided with a reduced threaded portion 16 which extends through to the front of the dash board where it engages the nut 17, thereby fastening the body to the dash board. The opposite end of said valve body has a suitable fitting 18 to connect the supply pipe 11 to the valve chamber 19, which extends through the said valve body. The valve body is also provided with two vertically extending threaded extensions, 20 and 21, each of which contains vertical passages, as at 22 and 23, extending from the valve chamber 19 and forming the intake passage of an injector. The ends of said extensions have tapered portions 22' and 23' hereinafter described. The valve body also is formed with a slot 25 in the valve chamber extending rearwardly of the passage 23, and also is provided with a downwardly extending detent boss 26 hereinafter more fully described.

Air pressure from the tank 10 is applicable through the tube 11 to the said passages 22 and 23, being controlled by a valve 27 slidably mounted in the valve chamber and having an extension 28 which protrudes through the threaded portion 16 for supporting a knob suitable for convenient manipulation by the driver of the car. The valve is shaped to provide at its end a shut-off portion 29 and also reduced portions 31, 32 and 33 which are adapted to engage with a detent pin 34 mounted in the detent boss 26 and urged in a vertical direction against the said reduced portions by the spring 31'.

Tubes 35 and 36 are screwed in place over extensions 20 and 21, respectively, and at the upper ends thereof are connected to the operating conduit 13 and parking conduit 14. Each of said tubes has a vertical passage 37 which is tapered to form the discharge passage of an injector. A number of spaced induction ports 38 are provided near the bottom of each tube, the lower walls of which extend inwardly to the bottom of the said tapered portions 22' and 23' on the extensions. The upper walls of said ports are rounded upwardly to the throat portion 39 of the passage 37. Thus the assembly of the tubes on the extension gives a tapered and upwardly extending shape to the ports as shown in Fig. 2, and also forms a completed injector.

In the operation of such a windshield cleaner as is shown in Fig. 1 and in the Hueber Patent No. 1,716,135 the following conditions must be in control of the valve mechanism, first, that with both wipers spaced and operating in unison, it is necessary to have both the operating conduit 13 and the parking conduit open to fluid pressure; second, that to close the space between the two wipers and to allow them to operate thus on the right hand half of the windshield only it is necessary to have the operating conduit only open to fluid pressure and the parking tube open to the atmosphere; third, that to stop the cleaner it is necessary to close both the said tubes to fluid pressure.

The control valve mechanism shown in Fig. 2 is set with the detent pin 34 in registry with the reduced portion 32 and is in the middle position or the second position previously described, fluid pressure entering the valve chamber from the supply pipe 11, and through the Venturi tube 35 to the windshield. With the valve set with the detent pin 34 in registry with reduced portion 33 it will be seen that the shut-off portion will be at its extreme left position, thereby shutting off fluid pressure from both tubes, as in the described third condition. With the valve set with the detent pin 34 in registry with the reduced portion 31, fluid pressure will enter the injector tube 35 to the cleaner, as in the first condition, and also will enter the Venturi tube 36.

The fluid pressure brake systems on motor busses, and other vehicles employing them, operate under a heavy pressure, and therefore the tank 10 of such system will have under storage a reserve supply which, for instance, is 100 lbs. per square inch. Consequently, should this pressure be connected to the cleaner by a closed conduit serious injury would result to the cleaner if the latter should be blocked or unduly resisted in its operation. Therefore, this pressure is applied through the supply pipe 11 to the control valve chamber 19 and from thence through the comparatively small injector orifice 22, which is proportioned to allow sufficient air therethrough to operate the cleaner at normal speeds.

This injector nozzle discharge may be at a pressure of approximately 10 lbs. per square inch and the flow escaping at a high velocity will inhale an augmented supply of air through the induction ports 38 so that the resultant flow at the cleaner will be of increased volume and of lesser velocity. Consequently, only a very small proportion of the fluid pressure supply for the brake system has to be utilized for the cleaner operation. Now, if the cleaner is blocked in its movement the induction ports 38 which under the normal operation of the cleaner act as air intake ports will constitute and function as safety venting means, permitting the pressure to escape to the atmosphere without injury to the cleaner. Therefore, the inclusion of the injector in the fluid pressure line to the cleaner is highly desirable for dual reasons, first to increase the volume of fluid taken from the brake system and modify it for a better and more suitable application of air to the cleaner which operates at comparatively slow and rythmic speeds, and second, to function as a safety means upon the accidental blocking of the cleaner when the injector action ceases and the ports 36 provide vents against the building up of excessive pressures in the cleaner line.

It will be understood that the injector principle of safety means may be applied to the cleaner system by a number of methods, and arrangements and that it is not intended to limit this invention to the preferred arrangement shown.

What is claimed is:

1. In combination with a fluid pressure operated windshield cleaner, an air supply means under high pressure, means for connecting said air supply to said cleaner, means for limiting said air supply to said cleaner to operate said cleaner at normal speeds, and safety means comprising an injector in said connecting means, said injector being provided with throat openings to provide air escape ports upon accidental blocking of said cleaner.

2. A windshield cleaner system comprising a compressed air operated cleaner, a passage for connecting the cleaner to a source of compressed air supply, and an injector interposed in the passage and discharging toward the motor for increasing the volume of the supplied compressed air and serving additionally as a safety vent in the event of the motor being abnormally resisted in its movement.

3. A windshield cleaner system comprising a compressed air operated motor, a source of compressed air supply, a passage connecting the supply to the motor, a valve in said passage for controlling said air supply to the motor, and an injector interposed in the passage between said motor and said valve to serve as a safety vent in the event of the motor being abnormally resisted in its movement.

4. A windshield cleaner system comprising a compressed air operated motor, a source of compressed air supply, a valve for controlling said air supply to said motor, an injector mounted on said valve and receiving said air supply therefrom, means for connecting said air supply source to said valve, and means for connecting the discharge end of said injector to said motor, said injector serving as a safety vent in the event of the motor being abnormally resisted in its movement.

5. A windshield cleaner system comprising a compressed air operated motor, a source of compressed air supply, a valve for controlling said air supply to said motor, means for connecting said air supply source to said valve, and an injector provided with an intake passage, a discharge passage and an induction passage, means for connecting said intake passage to said valve, and means for connecting said discharge passage to said motor, said induction passage serving as a safety vent in the event of the motor being abnormally resisted in its movement.

6. An automobile accessory system comprising a fluid pressure operated vehicle accessory, a passage for connecting the accessory to a source of compressed air supply, and an injector interposed in the passage and discharging toward the accessory for increasing the volume of the supplied compressed air and serving additionally as a safety vent in the event of the accessory being abnormally resisted in its movement.

ERWIN C. HORTON.
HENRY HUEBER.